(12) United States Patent
Park et al.

(10) Patent No.: US 12,319,221 B2
(45) Date of Patent: Jun. 3, 2025

(54) TETHER CLIP, PILLAR STRUCTURE PROVIDED WITH THE SAME, AND ASSEMBLY METHOD THEREOF

(71) Applicants: HYUNDAI MOTOR COMPANY, Seoul (KR); KIA CORPORATION, Seoul (KR); NIFCO KOREA INC., Anyang-si (KR)

(72) Inventors: Jiseob Park, Incheon (KR); Hyochul Myoung, Suwon-si (KR); Changmo Seong, Suwon-si (KR); SangWook Yi, Yeongcheon-si (KR); Y Tae Kim, Suwon-si (KR); Yoo Sung Doh, Anyang-si (KR)

(73) Assignees: HYUNDAI MOTOR COMPANY, Seoul (KR); KIA CORPORATION, Seoul (KR); NIFCO KOREA INC., Asan-si (KR)

( * ) Notice: Subject to any disclaimer, the term of this patent is extended or adjusted under 35 U.S.C. 154(b) by 0 days.

(21) Appl. No.: 18/625,855

(22) Filed: Apr. 3, 2024

(65) Prior Publication Data

US 2024/0246505 A1    Jul. 25, 2024

Related U.S. Application Data

(62) Division of application No. 17/828,345, filed on May 31, 2022, now Pat. No. 11,975,673.

(30) Foreign Application Priority Data

Jul. 23, 2021   (KR) .................. 10-2021-0097194

(51) Int. Cl.
*B60R 21/216* (2011.01)
*B60R 13/02* (2006.01)
*B60R 21/213* (2011.01)

(52) U.S. Cl.
CPC ........ *B60R 21/216* (2013.01); *B60R 13/0206* (2013.01); *B60R 13/025* (2013.01); *B60R 21/213* (2013.01)

(58) Field of Classification Search
CPC ................ B60R 21/213; B60R 21/216; B60R 2021/2161; B60R 2021/2163; B60R 13/0206; B60R 13/025
See application file for complete search history.

(56) References Cited

U.S. PATENT DOCUMENTS 6,336,768 B1 *   1/2002   Kraus ................. B60R 13/0206
                                                         24/297
6,394,695 B1     5/2002   Chausset
                         (Continued)

FOREIGN PATENT DOCUMENTS

JP          5471531 B2      4/2014
KR      20200046578 A  *    5/2020
WO       2009018311 A1      2/2009

*Primary Examiner* — Laura Freedman
(74) *Attorney, Agent, or Firm* — Lempia Summerfield Katz LLC

(57) ABSTRACT

A pillar structure includes a tether clip including a clip body having a panel anchor part and a trim anchor portion. The tether clip further includes: a head anchor part configured to be combined with the trim anchor portion, and a tether connecting the clip body and the head anchor part. The pillar structure further includes: a pillar panel connected with the panel anchor part; and a pillar trim including a tether clip bracket of which a head anchor part insertion hole and a trim anchor portion coupling hole are formed thereto.

6 Claims, 10 Drawing Sheets

(56) References Cited

U.S. PATENT DOCUMENTS

| | | | |
|---|---|---|---|
| 6,431,585 B1 | 8/2002 | Rickabus et al. | |
| 7,114,221 B2 * | 10/2006 | Gibbons | F16B 21/082 24/336 |
| 7,155,783 B2 | 1/2007 | Nessel et al. | |
| 7,338,068 B2 | 3/2008 | Kawai et al. | |
| 7,904,994 B2 * | 3/2011 | Girodo | F16B 21/09 24/453 |
| 8,316,514 B2 | 11/2012 | Sano | |
| 8,656,563 B2 * | 2/2014 | Hiramatsu | F16B 37/043 52/716.5 |
| 8,671,528 B2 * | 3/2014 | Hayashi | F16B 5/065 24/297 |
| 8,844,992 B1 * | 9/2014 | Noga | B60R 13/0206 296/1.08 |
| 9,132,789 B2 * | 9/2015 | Suzuki | F16B 19/1081 |
| 9,821,747 B2 | 11/2017 | Benedetti | |
| 9,938,997 B2 * | 4/2018 | Iwahara | F16B 5/0664 |
| 10,427,621 B2 * | 10/2019 | Lee | F16B 2/22 |
| 10,746,218 B2 * | 8/2020 | Huet | F16B 21/086 |
| 10,800,371 B2 | 10/2020 | Marini et al. | |
| 10,967,809 B2 | 4/2021 | Naoi | |
| 11,975,673 B2 * | 5/2024 | Park | B60R 21/213 |
| 2006/0239772 A1 * | 10/2006 | Kuroda | F16B 5/0657 403/329 |
| 2008/0235919 A1 | 10/2008 | Giddings et al. | |
| 2016/0230791 A1 * | 8/2016 | Albach | F16B 5/0657 |
| 2022/0332261 A1 | 10/2022 | Zou | |
| 2023/0030083 A1 | 2/2023 | Park et al. | |
| 2023/0118668 A1 | 4/2023 | He et al. | |

\* cited by examiner

TETHER CLIP, PILLAR STRUCTURE PROVIDED WITH THE SAME, AND ASSEMBLY METHOD THEREOF

CROSS-REFERENCE TO RELATED APPLICATIONS

This application is a divisional application of non-provisional U.S. patent application Ser. No. 17/828,345, filed on May 31, 2022, which claims priority to and the benefit of Korean Patent Application No. 10-2021-0097194, filed in the Korean Intellectual Property Office on Jul. 23, 2021, the entire contents of each of which are incorporated herein by reference.

BACKGROUND

(a) Field

The present disclosure relates to a tether clip. More particularly, the present disclosure relates to a tether clip, a pillar structure including the same and an assembly method thereof that is easy to assemble and suppresses interference during airbag operation.

(b) Description of the Related Art

In general, an airbag system is a safety device for an occupant of a vehicle, and is a device for minimizing injuries by directly colliding with an occupant by deploying an airbag between an occupant and a vehicle structure during a vehicle collision.

These airbag systems are installed in each part of the vehicle as needed. The driver's seat airbag device is installed inside the steering wheel to protect the driver's upper body and head, a passenger airbag device mounted on the upper side of the glove box to protect the occupants in the passenger seat, a curtain airbag (CAB) device, etc., which is deployed between an occupant and a door to protect the occupant during a side collision of a vehicle and the like have been proposed.

The curtain airbag is installed along the A-pillar of the vehicle, and serves to protect the head of the occupant by preventing the occupant from leaving the vehicle in the event of a side collision or a rollover accident after a side collision.

When a vehicle collides, an inflator is operated according to a collision detection signal of an impact sensor, and the curtain airbag is inflated and deployed by compressed air generated from the inflator.

At this time, the pillar trim and the pillar panel are separated, and the inflated curtain airbag is deployed into the gap between the pillar trim and the pillar panel and a tether clip is used to prevent the pillar trim from being completely separated from the pillar panel while creating a predetermined gap between the pillar trim and the pillar panel.

However, structural rigidity is insufficient due to the difference between the curtain airbag deployment direction and the tether clip opening direction, and the boss of the pillar trim may be damaged or the pillar trim may be separated.

In addition, when assembling the tether clip, it is difficult to assemble due to the shape of the pillar trim, and when the tether clip is removed, after-sales service may be difficult. If A/S is not possible, there may be cases where the entire tether clip needs to be replaced after the parts are removed.

In addition, during the part removal process, the panel hole may be deformed or parts may be damaged, and the opening amount between the pillar trim and the pillar panel may vary when the curtain airbag is deployed. Therefore, it is desired that curtain airbag deployment is performed uniformly regardless of the interior layout.

The above information disclosed in this Background section is only for enhancement of understanding of the background of the present disclosure, and therefore it may contain information that does not form the prior art that is already known to a person of ordinary skill in the art.

SUMMARY

The present disclosure provides a tether clip, a pillar structure including the same, and an assembly method thereof that is easy to assemble and suppresses interference during airbag operation.

According to an embodiment of the present disclosure, a tether clip may include: a clip body including a panel anchor part and a trim anchor portion, a head anchor part capable of being combined with the trim anchor portion, and a tether connecting the clip body and the head anchor part.

The panel anchor part may include a panel hook formed to protrude in the width direction, and a panel support formed to protrude more than the panel hook in the width direction.

The panel anchor part may further include a wing portion that is inclined from the panel support to the panel hook direction to protrude in the width direction.

The trim anchor portion may include a trim support formed to protrude in the width direction.

The tether may be connected to the trim support, and a connection angle between the tether and the trim support may be formed at an obtuse angle in the panel anchor part direction with respect to the trim support.

The trim anchor portion may further include a trim support protrusion part formed to protrude from the trim support.

The trim anchor portion may include an insert protrusion part formed in the length direction and the head anchor part may include a head insert part formed such that the insert protrusion part is inserted therein.

The head anchor part may further include a head insert part hook protruding inwardly from the head insert part to support the insert protrusion part.

The head anchor part may further include a head support formed to separate the head insert part across the center of the head insert part, and the insert protrusion part may be formed in pairs and respectively inserted into the head insert part separated by the head support.

The trim anchor portion may further include a trim anchor portion hook formed to protrude to be caught on the head insert part.

The head anchor part and the tether may be connected at an obtuse angle with respect to the longitudinal direction of the head anchor part.

The clip body, the head anchor part and the tether may be integrally formed of a plastic material with elasticity.

The tether clip according to an exemplary embodiment of the present disclosure may further include a separation prevention rod formed to protrude from the tether adjacent to the head anchor part.

A pillar structure according to another embodiment of the present disclosure may include: the tether clip above descried, a pillar panel connected with the panel anchor par; and a pillar trim including a tether clip bracket of which a head anchor part insertion hole and a trim anchor portion coupling hole are formed thereto. In particular, the head anchor part may be inserted into the tether clip bracket through the head anchor part insertion hole, the trim anchor portion may be inserted into the trim anchor portion coupling hole, and the trim anchor portion and the head anchor part may be combined.

The tether clip bracket may include a guide rail configured to mount the head anchor part in its length direction.

The guide rail may be formed in a direction vertical to the insert direction of the trim anchor portion.

The head anchor part may have a head anchor part height with a predetermined length and a head anchor part width longer than a width of the head anchor part, and the head anchor part insertion hole may be formed as a slit in a direction vertical to the mounting direction of the head anchor part.

In an embodiment of the present disclosure, a pillar structure assembly method of the pillar structure may include: inserting the head anchor part into the head anchor part insertion hole, combining the panel anchor part and the pillar panel, and coupling the trim anchor portion and the head anchor part by inserting the trim anchor portion through the trim anchor portion coupling hole.

The tether clip bracket may further include a guide rail configured to mount the head anchor part in its length direction, and the pillar structure assembly method may further include coupling the head anchor part along the guide rail and positioning the head anchor part in the trim anchor portion coupling hole.

The operation of inserting the head anchor part into the head anchor part insertion hole may be performed by twisting the head anchor part and inserting it into the head anchor part insertion hole.

According to the tether clip, pillar structure including the same and the assembly method thereof, assembly and A/S is easy.

In addition, according to the tether clip, pillar structure including the same and the assembly method thereof, the curtain airbag deployment may be performed uniformly regardless of the internal layout.

In addition, the effects obtainable or predicted by the embodiments of the present disclosure are to be disclosed directly or implicitly in the detailed description of the embodiments of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
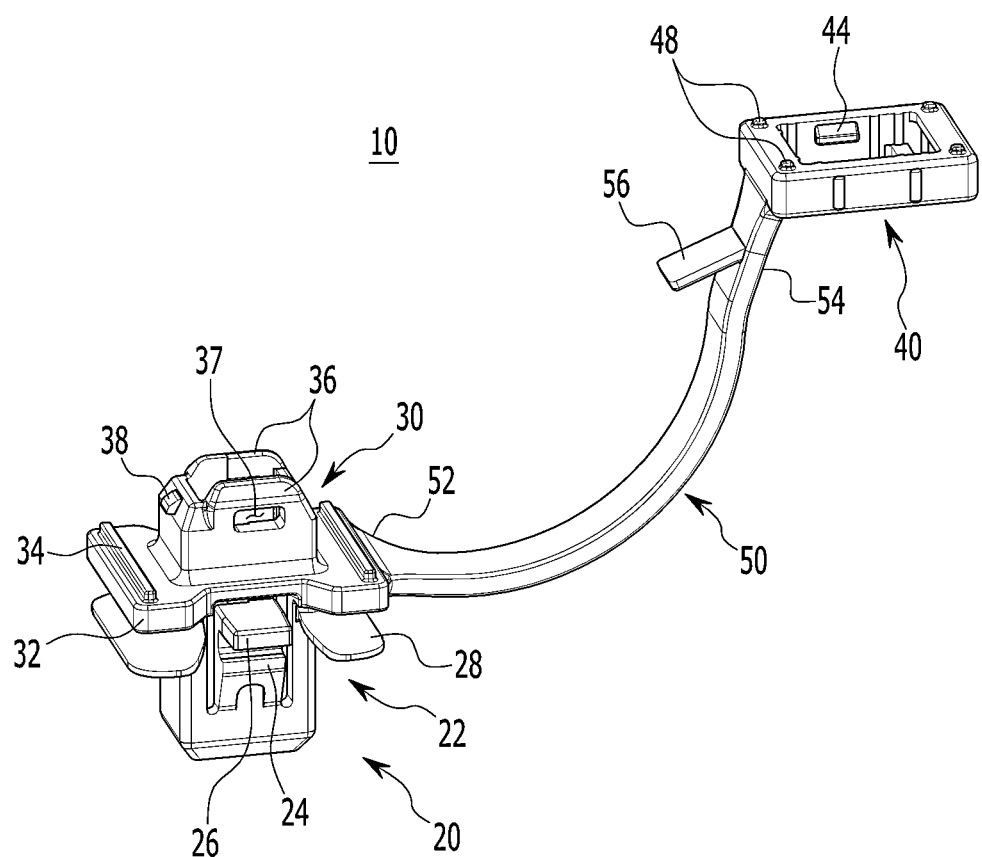
FIG. 1 is a perspective view before the assembly of the tether clip according to an exemplary embodiment of the present disclosure.

The drawings described herein are for illustration purposes only and are not intended to limit the scope of the present disclosure in any way.

DETAILED DESCRIPTION

The present disclosure is described more fully hereinafter with reference to the accompanying drawings, in which exemplary embodiments of the present disclosure are shown. As those having ordinary skill in the art would realize, the described embodiments may be modified in various different ways, all without departing from the spirit or scope of the present disclosure.

In order to clearly explain the present disclosure, parts irrelevant to the description are omitted, and the same reference numerals are assigned to the same or similar elements throughout the specification.

Since the size and thickness of each component shown in the drawings are arbitrarily indicated for convenience of description, the present disclosure is not necessarily limited to the bar shown in the drawings, and the thickness is enlarged to clearly express various parts and regions.

In addition, in the following detailed description, the reason that the names of components are divided into first, second, etc., is to classify them in the same relationship, and it is not necessarily limited to the order in the following description.

Throughout the present disclosure, when a part includes a certain element, it means that other elements may be further included, rather than excluding other elements, unless specifically stated otherwise.

In addition, terms such as . . . part, . . . means described in the present disclosure mean a unit of a comprehensive configuration that performs at least one function or operation.

When a part, such as a layer, film, region, plate, etc., is "on" another part, this includes not only the case where it is directly above the other part, but also the case where there is another part in between.

When a component, device, element, or the like of the present disclosure is described as having a purpose or performing an operation, function, or the like, the component, device, or element should be considered herein as being "configured to" meet that purpose or to perform that operation or function.

In contrast, when an element is referred to as being "directly on" another element, there are no intervening elements present.

Some embodiments of the present disclosure are hereinafter described in detail with reference to the accompanying drawings.

Figure 2:
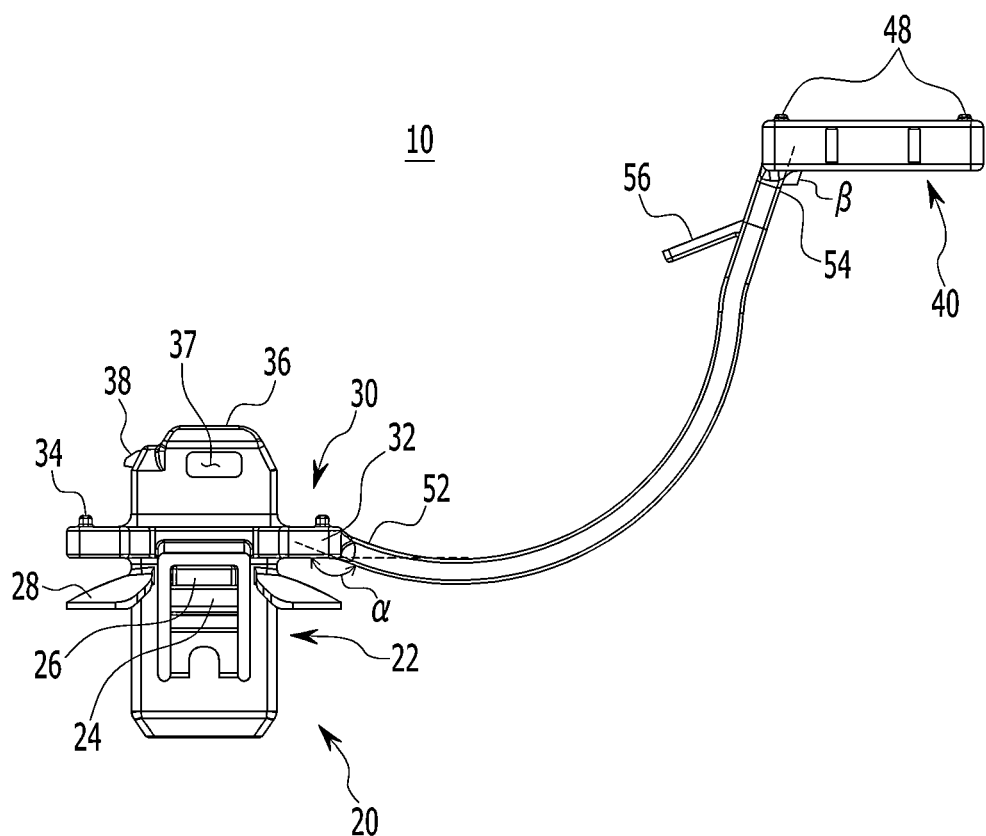
FIG. 2 is a front view before the assembly of the tether clip according to an exemplary embodiment of the present disclosure.
Figure 3:
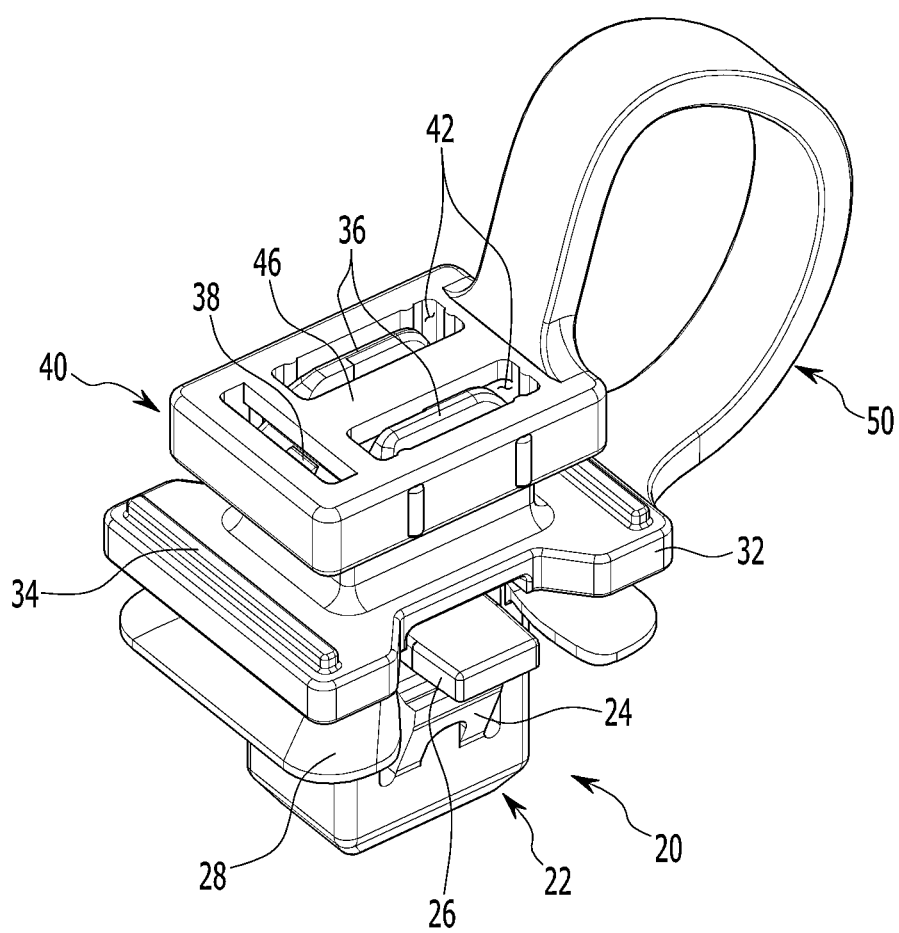
FIG. 3 is a perspective view after the assembly of the tether clip according to an exemplary embodiment of the present disclosure.

FIG. 1 is a perspective view before the assembly of the tether clip according to an embodiment of the present disclosure, FIG. 2 is a front view before the assembly of the tether clip according to an embodiment of the present disclosure, and FIG. 3 is a perspective view after the assembly of the tether clip according to an embodiment of the present disclosure.

Referring to FIG. 1 to FIG. 3, a tether clip 10 according to an embodiment of the present disclosure may include: a clip body 20 including a panel anchor part 22 and a trim anchor portion 30, a head anchor part 40 configured to be combined with the trim anchor portion 30, and a tether 50 connecting the clip body 20 and the head anchor part 40.

The clip body 20, the head anchor part 40 and the tether 50 may be formed of a plastic material with elasticity. Also, the tether clip 10 may be integrally formed, for example, of an impact resistant material such as PA66, but is not limited thereto.

The panel anchor part 22 may include a panel hook 24 formed to protrude in the width direction, and a panel support 26 formed to protrude more than the panel hook 24 in the width direction.

The panel anchor part 22 may further include a wing portion 28 that is inclined from the panel support 26 to the panel hook 24 direction to protrude in the width direction.

The trim anchor portion 30 may include a trim support 32 formed to protrude in the width direction.

In the present disclosure, the width direction is defined as a direction perpendicular to the longitudinal direction with respect to the panel anchor part 22, the trim anchor part 30, and the head anchor part 40.

The trim anchor portion 30 may further include a trim support protrusion part 34 formed to protrude from the trim support 32. The trim support protrusion part 34 serves to support a tether clip bracket 72.

The tether 50 is connected to the trim support 32, and the connection angle between the tether 50 and the trim support 32 may be formed at an obtuse angle "α" in the panel anchor part 22 direction with respect to the trim support 32. In other words, the connection angle between a first end 52 of the tether 50 and the trim support 32 is formed as an obtuse angle "α", so that residual stress may be reduced or minimized in the state of assembling the tether clip 10. Therefore, it is possible to minimize the possibility of separation between the first end 52 and the trim support 32 during operation or deployment of the curtain airbag.

The trim anchor portion 30 may include an insert protrusion part 36 formed in a length direction, and the head anchor part 40 may include a head insert part 42 formed such that the insert protrusion part 36 is inserted therein.

The head anchor part 40 may further include a head insert part hook 44 to protrude inwardly from the head insert part 42 to support the insert protrusion part 36. For example, a protrusion hole 37 is formed in the insert protrusion part 36, and the head insert part hook 44 may be inserted and fixed in the protrusion hole 37.

The head anchor part 40 may further include a head support 46 formed to separate the head insert part 42 across the center of the head insert part 42, and the insert protrusion part 36 is formed in pairs and can be respectively inserted into the head insert part 42 separated by the head support 46.

The trim anchor portion 30 may further include a trim anchor portion hook 38 formed to protrude to be caught on the head insert part 42.

The head anchor part 40 and the tether 50 may be connected at an obtuse angle "β" with respect to the longitudinal direction of the head anchor part 40. In other words, the connection angle between a second end 54 of the tether 50 and the head anchor part 40 is formed as an obtuse angle "β", so that residual stress may be minimized in the state of assembling the tether clip 10. Therefore, it is possible to minimize the possibility of separation of the second end 54 and the head anchor part 40 during the operation or deployment of the curtain airbag.

The head anchor part 40 may have a head protrusion 48, and the head protrusion 48 may support a tether clip bracket 72 to be described later.

The tether clip 10 according to an embodiment of the present disclosure may further include a separation prevention rod 56 formed to protrude from the tether 50 adjacent to the head anchor part 40.

Figure 4:
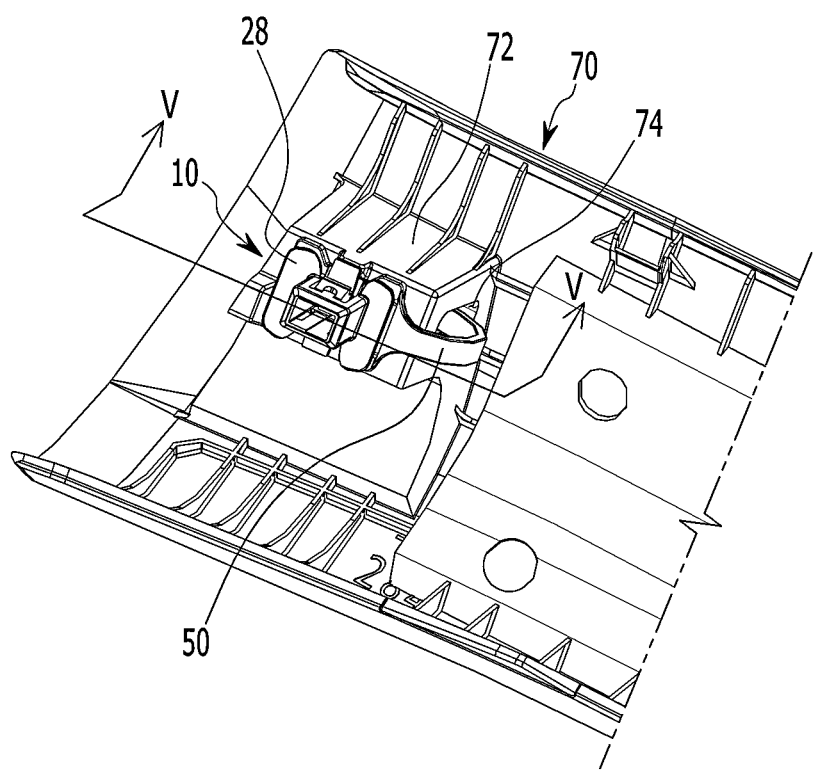
FIG. 4 is a perspective view of a pillar structure including a tether clip according to an exemplary embodiment of the present disclosure.
Figure 5:
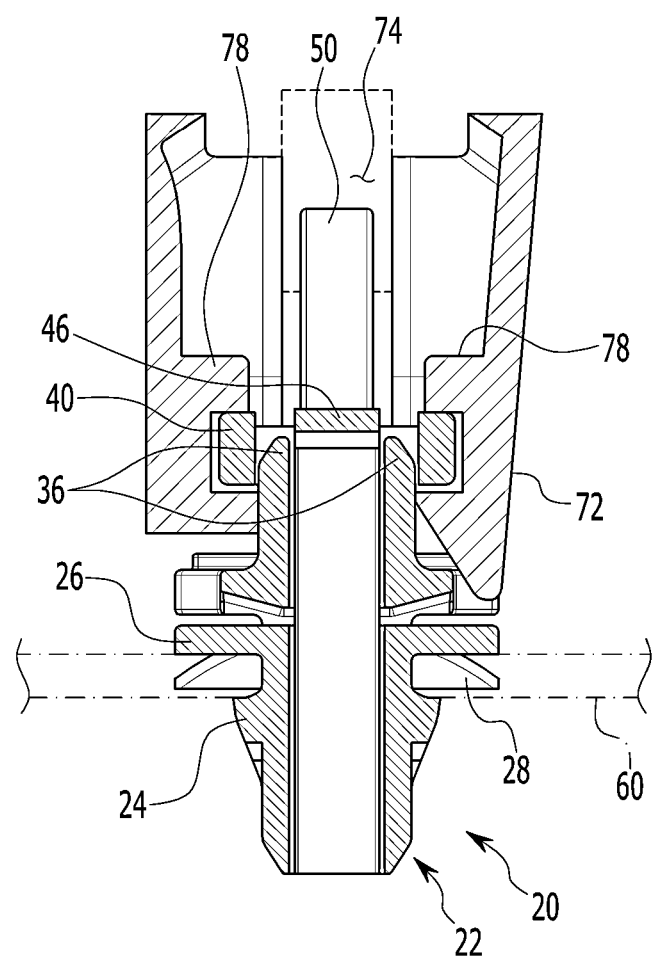
FIG. 5 is a cross-sectional view along the V-V line of FIG. 4.
Figure 6:
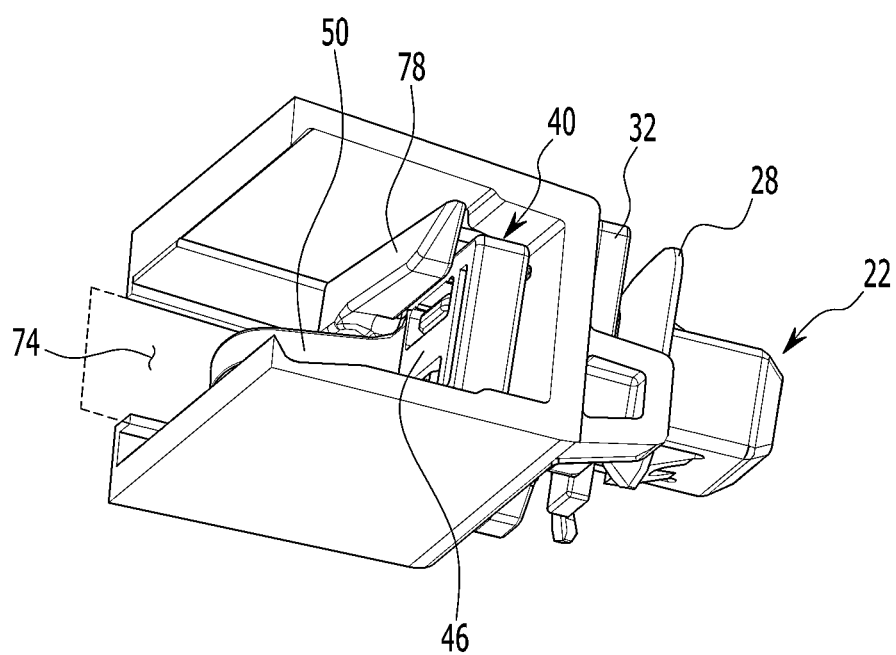
FIG. 6 is a perspective view of a tether clip and a tether clip bracket according to a modified embodiment of the present disclosure.

FIG. 4 is a perspective view of a pillar structure including a tether clip according to an embodiment of the present disclosure, FIG. 5 is a cross-sectional view along the V-V line of FIG. 4, and FIG. 6 is a perspective view of a tether clip and a tether clip bracket according to a modified embodiment of the present disclosure.

Hereinafter, a pillar structure according to an embodiment of the present disclosure is described with reference to FIG. 1 to FIG. 6.

The tether clip 10 described above is mounted on a pillar inside the vehicle, for example, A pillar, and when the curtain airbag is operated, the pillar trim and the pillar panel are separated. The tether clip 10 forms a space for the curtain airbag to protrude between the pillar trim and the pillar panel, but it can prevent the pillar trim and the pillar panel from being completely separated.

Figure 8:
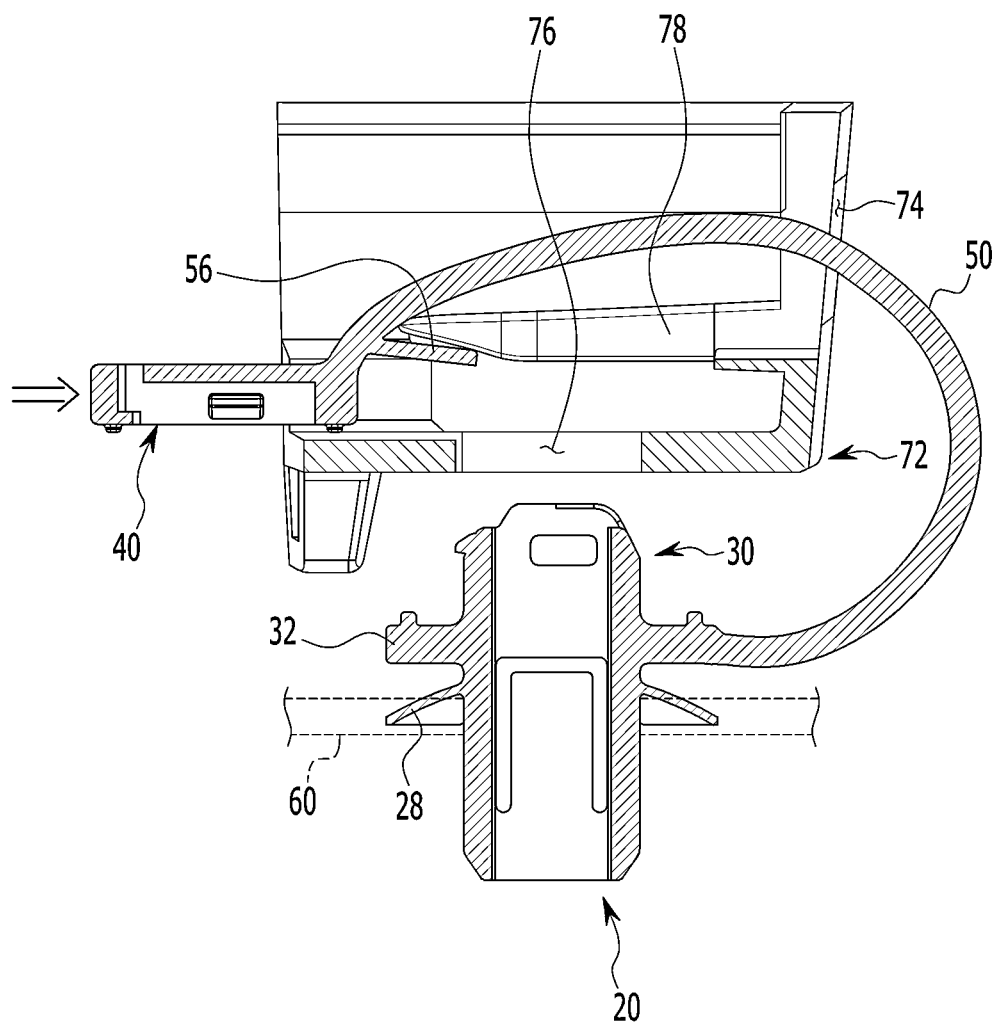

A pillar structure according to an embodiment of the present disclosure includes the tether clip 10, a pillar panel 60 connected with the panel anchor part 22, and a pillar trim 70 including a tether clip bracket 72 formed with a head anchor part insertion hole 74 and a trim anchor portion coupling hole 76 (referring to FIG. 8).

The head anchor part 40 is inserted into the tether clip bracket 72 through the head anchor part insertion hole 74, the trim anchor portion 30 is inserted into the trim anchor portion coupling hole 76, and thus the trim anchor portion 30 and the head anchor part 40 may be combined.

Referring to FIG. 1 and FIG. 5, when the panel anchor part 22 is inserted into the pillar hole of the pillar panel 60, the panel hook 24 has elasticity, so the pillar panel 60 is positioned between the panel support 26 and the panel hook 24. The pillar panel 60 may be fixed by the panel hook 24 and the panel support 26. The wing portion 28 is a material with elasticity, and when combined with the pillar panel 60, it deforms upward, as illustrated in FIG. 5, and the pillar panel 60 and the panel anchor part 22 may be firmly coupled.

The trim anchor portion hook 38 is caught on the end of the head anchor part 40 when the trim anchor portion 30 and the head anchor part 40 are coupled, and the trim anchor portion 30 and the head anchor part 40 may be stably coupled.

In addition, the head insert part hook 44 is inserted into the protrusion hole 37 when the trim anchor portion 30 and the head anchor part 40 are combined, and the trim anchor portion 30 and the head anchor part 40 can be stably combined.

Figure 7:
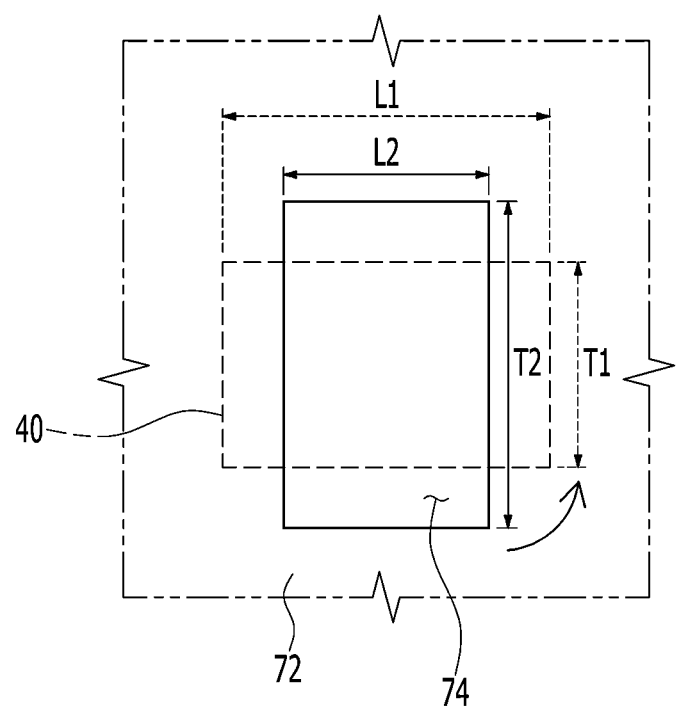
FIG. 7 is a drawing explaining the insert method of the tether clip according to an exemplary embodiment of the present disclosure; and FIG. 8 to FIG. 10 is a view showing the operation of the tether clip according to a modified embodiment of the present disclosure.

FIG. 7 is a drawing explaining the insert method of the tether clip according to an embodiment of the present disclosure.

Referring to FIG. 5 to FIG. 7, the head anchor part 40 has a head anchor part height T1 with a predetermined length and a head anchor part width L1 longer than the height T1 of the head anchor part 40. The head anchor part insertion hole 74 may be formed as a slit (long hole) in a direction vertical to the mounting direction of the head anchor part 40.

For example, the height T2 of the head anchor part insertion hole 74 is formed to have a length longer than the width L1 of the head anchor part 40, and the width L2 of the head anchor part insertion hole 74 is formed to have a length longer than the height T1 of the head anchor part 40.

In other words, the head anchor part 40 is formed to be long in the width direction, and the head anchor part insertion hole 74 is formed to be long in the length direction. Thus the head anchor part 40 is twisted and inserted into the head anchor part insertion hole 74, and then the head anchor part 40 is deformed again to its original state and is combined with the clip body 20. After that, when the curtain airbag is operated, the head anchor part 40 is prevented from coming out through the head anchor part insertion hole 74, thereby preventing the pillar trim 70 from being completely separated.

In addition, the separation prevention rod 56 is a material with elasticity, allows the head anchor part 40 to be inserted into the head anchor part insertion hole 74 and may prevent the head anchor part 40 from escaping from the head anchor part insertion hole 74.

Hereinafter, referring to FIG. 1 to FIG. 5 and FIG. 7, a pillar structure assembly method according to an embodiment of the present disclosure is described.

The head anchor part 40 is inserted into the head anchor part insertion hole 74, and the panel anchor part 22 and the pillar panel 60 are combined.

Here, the order in which the head anchor part 40 is inserted into the head anchor part insertion hole 74 and the panel anchor part 22 and the pillar panel 60 are coupled may be reversed.

As shown in FIG. 7, inserting the head anchor part 40 into the head anchor part insertion hole 74 may be performed by twisting the head anchor part 40 and inserting it into the head anchor part insertion hole 74.

Then, the trim anchor portion 30 may be inserted through the trim anchor portion coupling hole 76 to couple the trim anchor portion 30 and the head anchor part 40. In this case, after the head anchor part 40 is positioned at a position corresponding to the trim anchor portion coupling hole 76, the trim anchor portion 30 may be coupled to the head anchor part 40. The head anchor part 40 may be coupled by pushing the trim anchor portion 30 in a fixed state using a worker's hand or tool.

Hereinafter, referring to FIG. 5 and FIG. 6, a pillar structure according to a modified embodiment of the present disclosure is described.

Referring to FIG. 5 and FIG. 6, the tether clip bracket 72 may include a guide rail 78 configured to mount the head anchor part 40 in its length direction.

The guide rail 78 may be formed in a direction vertical to the insert direction of the trim anchor portion 30.

Figure 9:
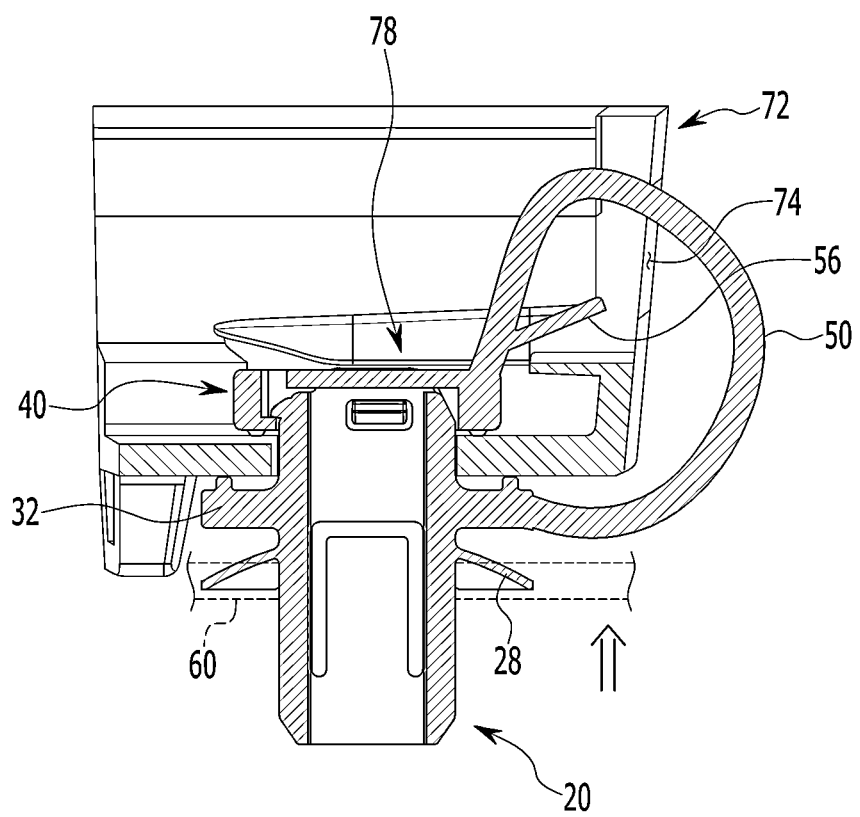
Figure 10:
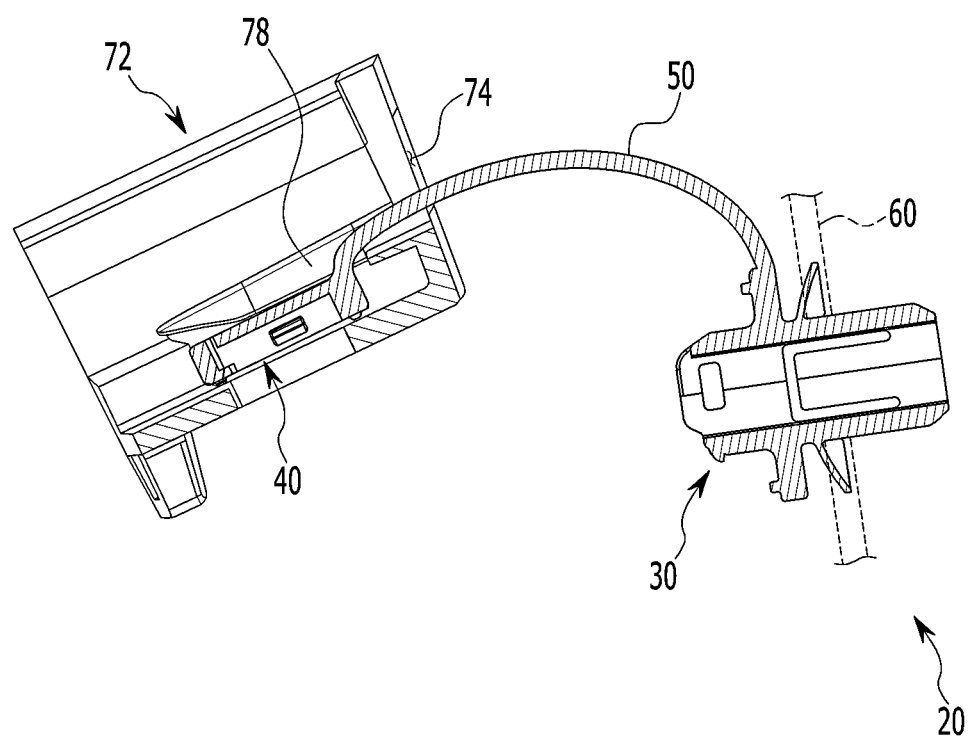

FIG. 8 to FIG. 10 is a view showing the operation of the tether clip according to a modified embodiment of the present disclosure.

In the pillar structure assembly method according to a modified embodiment of the present disclosure, the head anchor part 40 is inserted into the head anchor part insertion hole 74, the panel anchor part 22 and the pillar panel 60 are combined, and the trim anchor portion 30 is inserted through the trim anchor portion coupling hole 76 so that the trim anchor portion 30 and the head anchor part 40 may be coupled.

In this case, the tether clip bracket 72 further includes the guide rail 78 formed so that the head anchor part 40 is mounted in the length direction, and the head anchor part 40 may be coupled along the guide rail 78 to be positioned in the trim anchor portion coupling hole 76.

The operation of inserting the head anchor part 40 into the head anchor part insertion hole 74 may be performed by twisting the head anchor part 40 and inserting it into the head anchor part insertion hole 74.

In the pillar structure assembly method according to a modified embodiment of the present disclosure, after coupling the head anchor part 40 to the guide rail 78, the trim anchor portion 30 and the head anchor part 40 are combined. Accordingly, the trim anchor portion 30 and the head anchor part 40 may be combined by pushing the trim anchor portion 30 without fixing the head anchor part 40 using a worker's hand or tool. Accordingly, the assembly process may be simplified.

Also, as shown in FIG. 10, when the curtain airbag operates, the head anchor part 40 is fixed by the guide rail 78 to prevent the pillar trim 70 from being completely separated from the pillar panel 60.

In FIG. 8 and FIG. 9, the separation prevention rod 56 is shown as being connected to the tether 50, but the pillar structure according to a modified exemplary embodiment of the present disclosure is also possible in the configuration in which the separation prevention rod 56 is removed.

In other words, as shown in FIG. 10, the head anchor part 40 may be maintained in a fixed state by the guide rail 78, so the separation prevention rod 56 may be removed.

As described above, according to the tether clip according to an embodiment of the present disclosure, the pillar structure including the same, and the assembly method thereof, assembly and A/S may be easy.

In addition, the curtain airbag deployment may be performed uniformly regardless of the internal layout.

In addition, the connection angle between the tether and the trim support is formed at an obtuse angle, and the connection angle between the tether and the head anchor part is formed at an obtuse angle, so residual stress may be minimized, thereby preventing complete separation of the pillar trim when the curtain airbag is deployed.

While this present disclosure has been described in connection with what is presently considered to be practical embodiments, it is to be understood that the present disclosure is not limited to the disclosed embodiments. On the contrary, it is intended to cover various modifications and equivalent arrangements included within the spirit and scope of the present disclosure.

<Description of symbols>

| | |
|---|---|
| 10: tether clip | 20: clip body |
| 22: panel anchor part | 24: panel hook |
| 26: panel support | 28: wing portion |
| 30: trim anchor portion | 32: trim support |
| 34: trim support protrusion part | 36: insert protrusion part |
| 37: protrusion hole | 38: trim anchor portion hook |
| 40: head anchor part | 42: head insert part |
| 44: head insert part hook | 46: head support |
| 48: head protrusion | 50: tether |
| 52: first end | 54: second end |
| 56: separation prevention rod | 60: pillar panel |
| 70: pillar trim | 72: tether clip bracket |
| 74: head anchor part insertion hole | |
| 76: trim anchor portion coupling hole | |
| 78: guide rail | 100: pillar structure |

What is claimed is:

1. A pillar structure comprising:
    a tether clip comprising:
        a clip body including a panel anchor part and a trim anchor portion,
        a head anchor part configured to be combined with the trim anchor portion, and
        a tether connecting the clip body and the head anchor part;
    a pillar panel connected with the panel anchor part; and a pillar trim including a tether clip bracket of which a head anchor part insertion hole and a trim anchor portion coupling hole are formed thereto, wherein:
- the head anchor part is inserted into the tether clip bracket through the head anchor part insertion hole,
- the trim anchor portion is inserted into the trim anchor portion coupling hole,
- the trim anchor portion and the head anchor part are combined,
- the head anchor part has a predetermined height and a predetermined width that is greater than the predetermined height of the head anchor part, and
- the head anchor part insertion hole is formed as a slit in a direction vertical to a mounting direction of the head anchor part, and the predetermined width of the head anchor part is greater than a width of the head anchor part insertion hole such that the head anchor part is twisted and inserted into the head anchor part insertion hole.

2. The pillar structure of claim 1, wherein the tether clip bracket comprises a guide rail configured to mount the head anchor part in its length direction.

3. The pillar structure of claim 2, wherein the guide rail is formed in a direction vertical to an insert direction of the trim anchor portion.

4. A pillar structure assembly method for a pillar structure including a tether clip, a pillar panel and a pillar trim, the pillar structure assembly method comprising:
- inserting a head anchor part of the tether clip into a head anchor part insertion hole of the pillar trim;
- combining the pillar panel and a panel anchor part of a clip body of the tether clip;
- coupling the head anchor part and a trim anchor portion of the clip body by inserting the trim anchor portion through a trim anchor portion coupling hole of the pillar trim; and
- inserting the head anchor part into the head anchor part insertion hole by twisting the head anchor part and inserting the head anchor part into the head anchor part insertion hole.

5. The pillar structure assembly method of claim 4, further comprising:
- coupling the head anchor part along a guide rail of a tether clip bracket; and
- positioning the head anchor part in the trim anchor portion coupling hole, wherein the pillar trim includes the tether clip bracket.

6. A pillar structure comprising:
a tether clip comprising:
- a clip body including a panel anchor part and a trim anchor portion,
- a head anchor part configured to be combined with the trim anchor portion,
- a tether connecting the clip body and the head anchor part, and
- a separation prevention rod;

a pillar panel connected with the panel anchor part;
a pillar trim including a tether clip bracket of which a head anchor part insertion hole and a trim anchor portion coupling hole are formed thereto; and wherein:
- the separation prevention rod is configured to prevent the head anchor part from escaping through the head anchor part insertion hole,
- the head anchor part is inserted into the tether clip bracket through the head anchor part insertion hole,
- the trim anchor portion is inserted into the trim anchor portion coupling hole, and
- the trim anchor portion and the head anchor part are combined.

\* \* \* \* \*